Aug. 13, 1929.  C. M. LUCK  1,724,489
TRACTOR TRAILER
Filed June 8, 1925  3 Sheets-Sheet 1
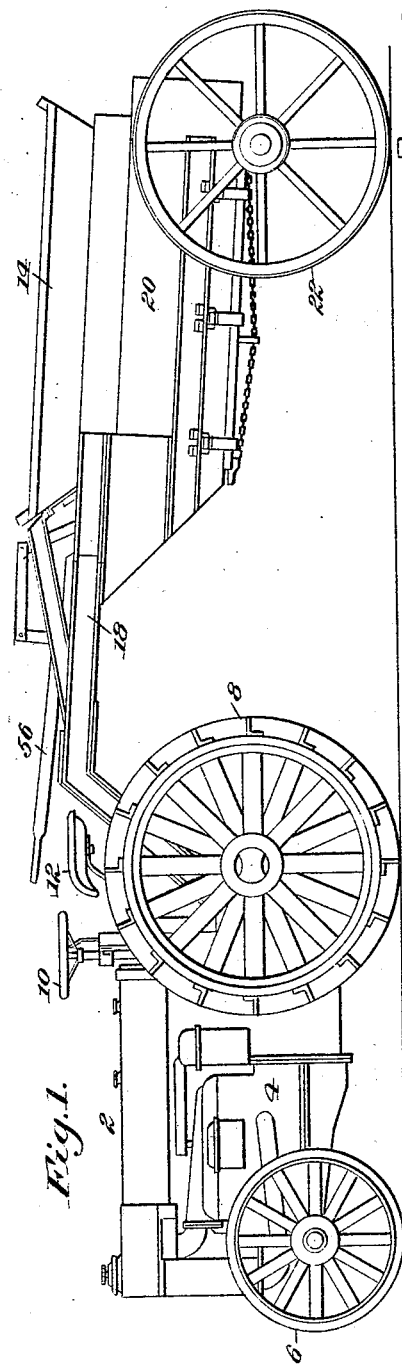
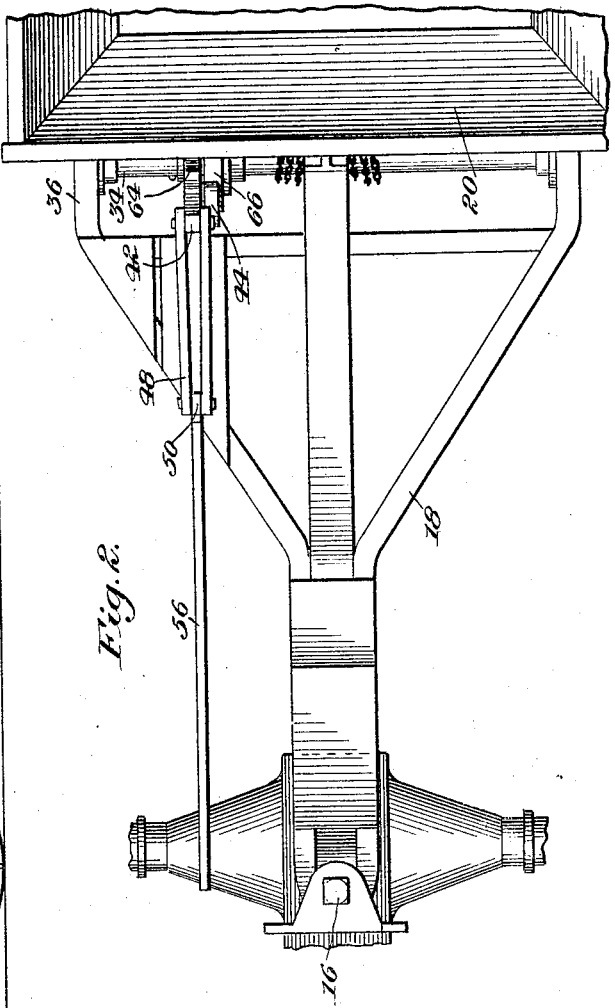
Inventor:
Charles M. Luck,
Baker + Co
Att'ys.

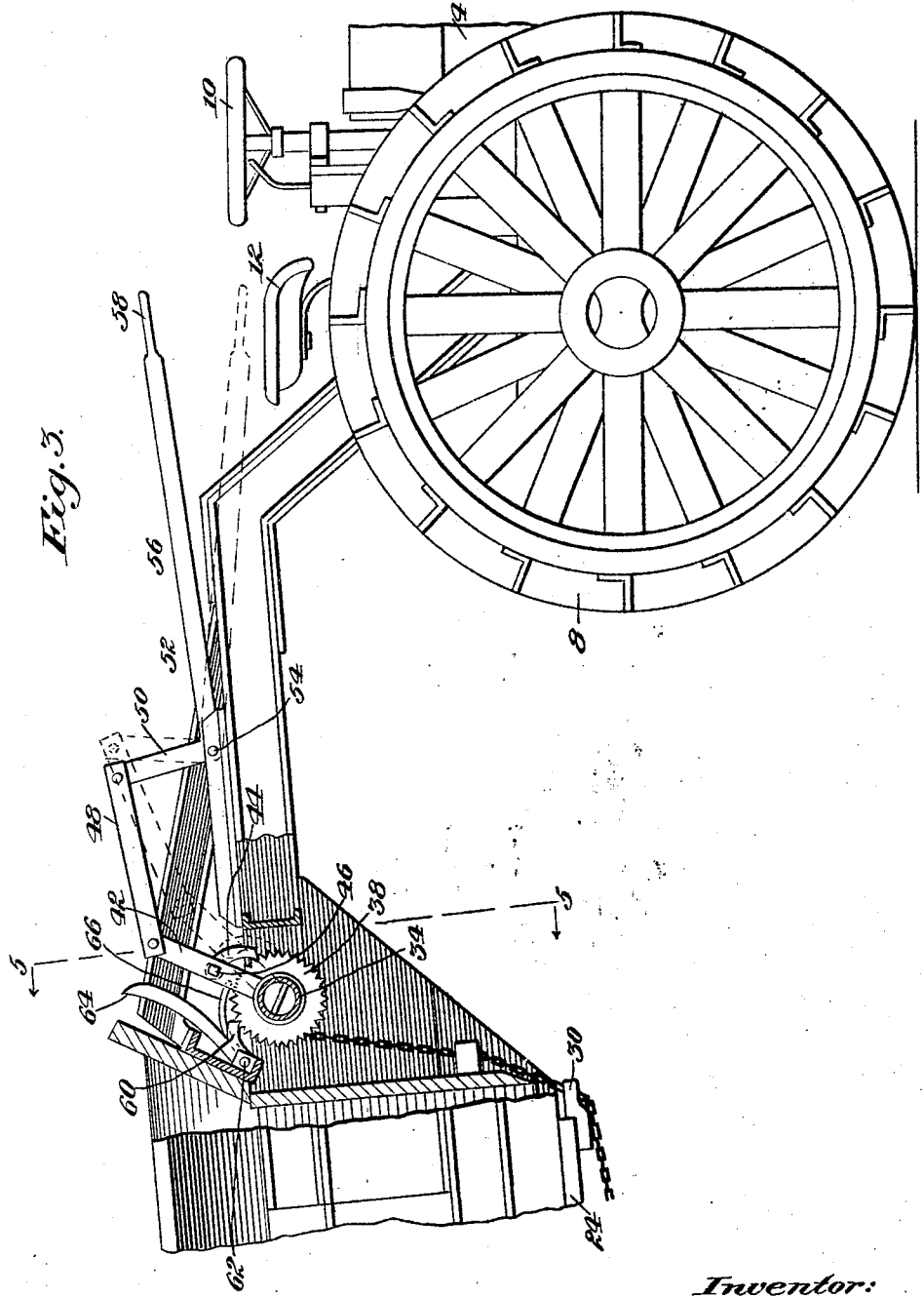

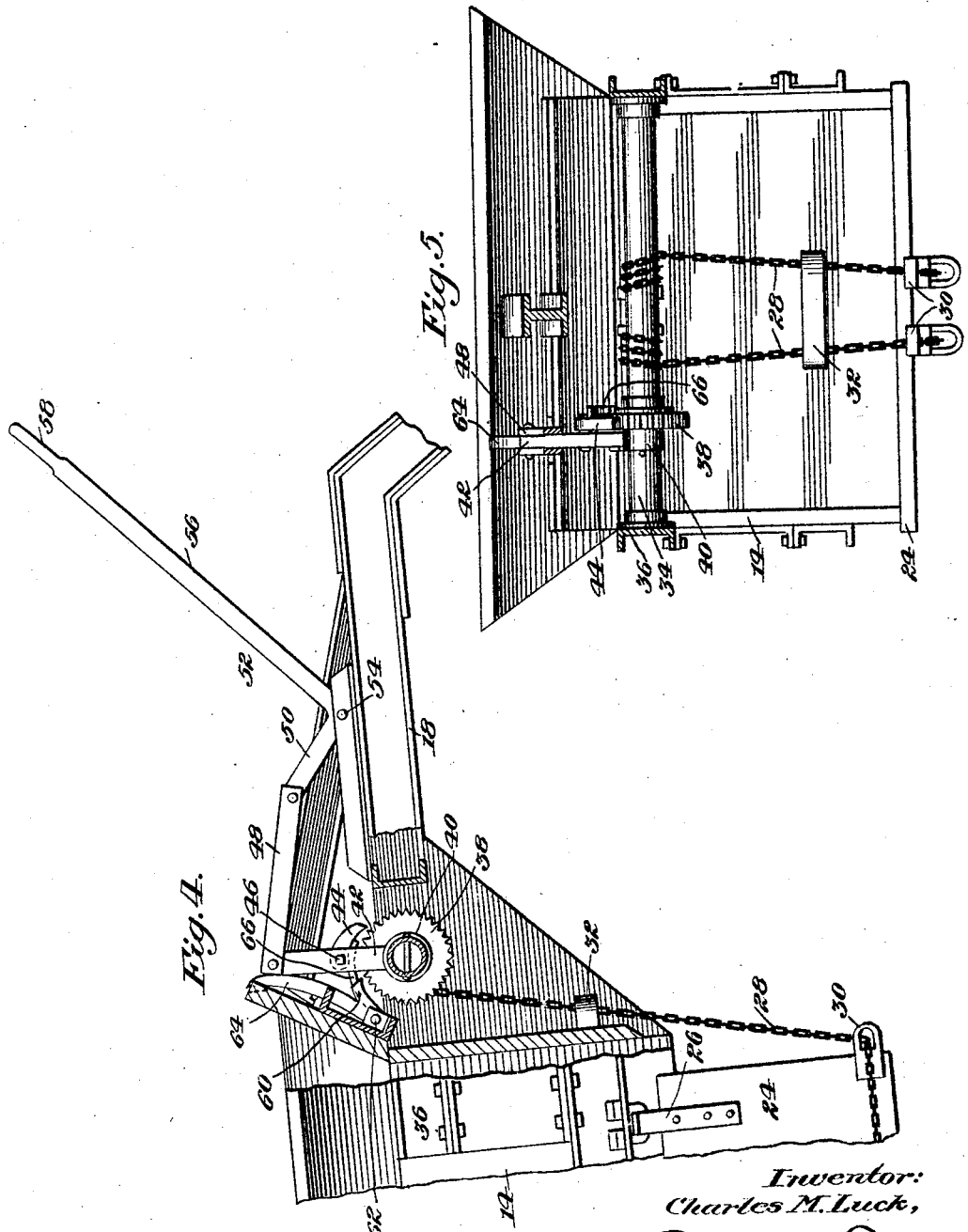

Patented Aug. 13, 1929.

1,724,489

UNITED STATES PATENT OFFICE.

CHARLES MERLE LUCK, RICHMOND, VIRGINIA.

TRACTOR TRAILER.

Application filed June 8, 1925. Serial No. 35,779.

This invention relates to a tractor trailer and has particular reference to trailers of the bottom-discharging type.

The use of a transportation system including a tractor and trailer is rapidly increasing due to many advantages incident thereto, such as a large load capacity, great power, and general efficiency. Many different types of trailers have been used in this manner, the particular type selected being adapted to the working conditions and nature of the load to be carried. In a road tractor-trailer, for example, it is customary to use a trailer having a bottom formed by pivoted doors normally retained in a horizontal or load-carrying position, but which, when released, assume an inclined or vertical position to permit the discharge of the load in the trailer. Several practical disadvantages develop in the use of a trailer of the type mentioned, the chief of which is the unreliability of the dumping mechanism, it being a common occurrence for the doors to be released and dump the load at points between the charging station and the intended destination. Another well known disadvantage resides in the fact that the dumping mechanism is generally inaccessible from the driver's seat, it being necessary for the driver to either dismount entirely to operate the same or to turn completely around. In either event, efficiency in operation is sacrificed.

This invention has for a general object the provision of a tractor-trailer vehicle in which the disadvantages enumerated are entirely overcome.

A further object is to provide a bottom discharging trailer in which the load releasing mechanism is accessible to the driver while in the normal driving position.

Another object of the invention is to provide an improved mechanism for controlling the doors of the trailer which is efficient in operation and reliable in use.

These and other features of the invention will appear more fully from the following detailed description when read in connection with the accompanying drawings and will be pointed out in the appended claims.

In the drawings:

Figure 1 is a side elevation of a combined tractor-trailer embodying this invention;

Fig. 2 is a fragmentary plan view of the trailer frame showing the arrangement of the door controlling mechanism;

Fig. 3 is a side elevation of the central portion of the vehicle, parts being in section to show the details of the controlling mechanism in load carrying position;

Fig. 4 is a view similar to Fig. 3 showing the parts in load discharging position;

Fig. 5 is a section on line 5—5 of Fig. 3 looking in the direction of the arrows.

Referring more particularly to the drawings, the reference character 2 denotes generally a tractor of the "Fordson" type having a body 4, front wheels 6, rear wheels 8, a steering wheel 10, and a driver's seat 12 in operative proximity to the steering wheel.

A trailer 14 is adapted to be detachably secured to the rear end of the tractor by means of a king pin 16 which engages the forward extremity of the trailer frame 18. Any desired type of trailer may be used depending upon the working conditions and the nature of the load, but for purposes of illustration, this invention is shown as applied to a trailer having a body 20 mounted upon two rear wheels 22. The bottom of the body is formed by the doors 24 pivotally connected by means of straps 26 to the sides of the body, the doors being normally closed to sustain the load being carried, but adapted to swing downwardly when released to discharge the load through the bottom of the trailer.

This invention is chiefly concerned with the mechanism for controlling the operation of the trailer doors 24, and such mechanism will now be described, particular attention being directed to Figs. 3, 4, and 5 of the drawings. Secured to the bottom of the doors along the inner or adjacent edges are chains 28 connected to the doors in any desirable manner, such as rivets or straps. The front edges of the doors are provided with guide members 30, through which the chains extend, as clearly shown in Figs. 4 and 5. The chains also pass through a guide strap 32 secured to the front of the body and are attached at the upper ends to a winding mandrel or drum 34. The drum 34 is preferably hollow, and is rotatably mounted upon the side bars 36 which constitute a portion of the trailer frame. Rigidly mounted upon the mandrel and in non-rotative connection therewith is a toothed ratchet wheel 38. Loosely mounted upon the mandrel adjacent to the ratchet wheel is a hub 40 having an upstanding arm 42 integrally formed thereon. A dog or pawl 44 is pivotally connected to the arm 42 as at 46, the pawl being arranged normally to engage the ratchet wheel and cooperate therewith to wind the drum when the arm 42 is moved in a clockwise direction. The upper end of the pawl carrying arm is connected by means of a link 48 to the short arm 50 of an elbow lever 52 which is pivoted to the trailer frame at 54. The long arm 56 of the elbow lever 52 extends toward the tractor and terminates at a point adjacent the front end of the driver's seat, the front extremity of the arm being formed as a handle 58. In order to produce a clockwise or winding motion to the chain drum 34, the handle is moved from the position shown in full lines in Fig. 3 to the dotted line position. The reverse of this handle movement produces no effect on the drum, as the pawl will simply drag idly along the ratchet teeth in a manner clearly understood. To prevent the drum 34 from unwinding during the idle stroke of the handle, a second pawl 60 is pivotally connected to the frame at 62 in position to normally engage the ratchet teeth and lock the drum against counter-clockwise rotation. The pawl 60 has an upwardly extending tail 64 formed integral therewith, the weight of the tail being sufficient to maintain the pawl in active engagement with the ratchet teeth, thereby eliminating the necessity of a spring or similar means for accomplishing this result. The pawl tail 64 is arranged directly behind the arm 42 for a purpose hereinafter explained.

A forwardly extending cam member 66 is attached to the frame of the trailer so that the front end thereof is arranged in the path of the pawl 44 and functions to disengage the pawl 44 from the ratchet wheel when the pawl is carried rearwardly a sufficient distance. Simultaneously with the engagement between the cam member 66 and the pawl 44, the arm 42 strikes the tail 64 and pushes the latter rearwardly, thereby disengaging the pawl 60 and the ratchet wheel. With both pawls out of engagement with the ratchet teeth, the drum 34 is free to unwind or rotate in a counter-clockwise direction, thereby permitting the doors 24 to drop and discharge the load from the trailer, as clearly illustrated in Fig. 4.

In the use of the vehicle, the handle 58 normally occupies the horizontal position indicated in full lines in Fig. 3. When the load is to be discharged, the handle is elevated to the position shown in Fig. 4 in which the chain drum is entirely released and therefore, is free to unwind. To close the trailer doors, the handle is moved successively from the full line position in Fig. 3 to the dotted line position, each downward stroke of the handle serving to wind the chain drum an amount corresponding to the throw of the pawl 44. The weight of the handle 58 is sufficient to maintain it in the normal horizontal position, it being practically impossible for the doors of the trailer to be released by accident or without the intention of the operator.

As previously explained, the handle for controlling the dumping mechanism is located at the driver's side in a position to be conveniently operated while the driver is in normal position in the seat. This is an important practical advantage, since the driver can both close and open the doors of the trailer without removing one hand from the steering wheel or taking his eyes from the front of the tractor. The load can be dumped and the doors closed while the vehicle is in motion and under complete control. The efficiency of the tractor-trailer is, therefore, materially increased due to a saving of both time and labor.

Having described my invention, what I claim as new and desire to secure by Letters Patent of the United States is:

1. A tractor-trailer having in combination, a load carrying body, doors pivoted to said body and adapted when in horizontal position to form the bottom thereof, door actuating chains, a drum rotatably mounted in the trailer frame, the said chains being connected to the doors and the drum, a ratchet wheel rigidly secured to said drum, a hub loosely mounted on the drum adjacent the ratchet wheel, a pawl carrying arm on said hub, a pawl pivoted to said arm and adapted to engage the said ratchet wheel to move the drum in a direction to wind up said chains when the arm is moved in a clockwise direction, an elbow lever pivoted to the trailer frame, a link connecting one end of the elbow lever to the pawl carrying arm, the free arm of the elbow lever being extended to a point adjacent to the driver's seat to form a handle for oscillating the pawl carrying arm, a finger for disengaging the said pawl from the ratchet teeth when the pawl carrying arm is moved a predetermined distance in a counter-clockwise direction, a second pawl pivoted to the trailer in position to engage the said ratchet wheel and prevent the chain drum from unwinding, an upwardly extending tail formed integral with the second pawl and arranged in the path of the pawl carrying arm whereby the second pawl will be disengaged from the ratchet teeth simultaneously with the disengagement of the first pawl to permit the unwinding of the drum and the discharge of the load.

2. In combination with a tractor of the type in which the driver's seat is disposed at the rear above the draw bar, a trailer vehicle comprising a load carrying body, doors pivoted to the body and adapted when closed to form the bottom thereof, a drum rotatably mounted upon the frame of the trailer, flexible means connected to said doors and adapted to wind upon the drum, a ratchet wheel secured to the drum, an operating lever, a pawl indirectly connected thereto for engaging the ratchet wheel to positively rotate the drum to close said doors, means for locking the ratchet wheel against reverse rotation, mechanism for rendering the pawl and locking means inoperative, and a linkage connecting the operating lever and pawl for actuating said mechanism, said linkage being disposed in such a manner as to actuate said mechanism only when the operating lever approaches a vertical position, and to cause engagement of the pawl and ratchet wheel only when the operating lever approaches a horizontal position, the weight of the lever in its horizontal position thus serving to prevent unwinding movement of the drum and accidental displacement of the locking means, the frame of the trailer vehicle being attached to the aforesaid tractor, and the operating lever extending forwardly to a position beside and slightly above the driver's seat.

In testimony whereof I affix my signature.

CHARLES MERLE LUCK.